(12) United States Patent
Hamway et al.

(10) Patent No.: US 8,137,108 B2
(45) Date of Patent: Mar. 20, 2012

(54) BEHAVIORAL MODIFICATION SYSTEM AND METHOD

(76) Inventors: Rose Marie Hamway, Oro Valley, AZ (US); Jeffrey Victor Dozoretz, Oro Valley, AZ (US)

(*) Notice: Subject to any disclaimer, the term of this patent is extended or adjusted under 35 U.S.C. 154(b) by 1019 days.

(21) Appl. No.: 11/969,317

(22) Filed: Jan. 4, 2008

(65) Prior Publication Data

US 2008/0227065 A1 Sep. 18, 2008

Related U.S. Application Data

(60) Provisional application No. 60/878,777, filed on Jan. 4, 2007.

(51) Int. Cl.
*G09B 9/00* (2006.01)
(52) U.S. Cl. .......... 434/236; 434/237; 434/238
(58) Field of Classification Search .......... 434/236–238
See application file for complete search history.

(56) References Cited

U.S. PATENT DOCUMENTS

| | | | | |
|---|---|---|---|---|
| 4,300,129 A * | 11/1981 | Cataldo | | 340/539.11 |
| 5,189,413 A * | 2/1993 | Gaskill et al. | | 340/7.38 |
| 5,190,459 A * | 3/1993 | Determan | | 434/236 |
| 5,197,489 A * | 3/1993 | Conlan | | 600/595 |
| 5,285,430 A * | 2/1994 | Decker | | 368/281 |
| 5,436,622 A * | 7/1995 | Gutman et al. | | 340/7.6 |
| 5,444,671 A * | 8/1995 | Tschannen et al. | | 368/10 |
| 5,595,488 A * | 1/1997 | Gozlan et al. | | 434/236 |
| 5,679,004 A * | 10/1997 | McGowan et al. | | 434/247 |
| 5,697,790 A * | 12/1997 | Garland et al. | | 434/236 |
| 5,841,345 A * | 11/1998 | Kestenberg | | 340/440 |
| 5,861,797 A * | 1/1999 | Becker | | 340/309.3 |
| 6,275,159 B1 * | 8/2001 | Pinnow et al. | | 340/573.4 |
| 6,558,165 B1 * | 5/2003 | Curry et al. | | 434/236 |
| 6,582,380 B2 * | 6/2003 | Kazlausky et al. | | 600/595 |
| 6,724,298 B2 * | 4/2004 | Smith | | 340/407.1 |
| 7,196,619 B2 * | 3/2007 | Perlman et al. | | 340/457 |
| 2001/0029319 A1 * | 10/2001 | Kazlausky et al. | | 600/300 |
| 2002/0197588 A1 * | 12/2002 | Wood et al. | | 434/185 |
| 2004/0063081 A1 * | 4/2004 | Lipkins | | 434/236 |
| 2004/0115603 A1 * | 6/2004 | Reynolds | | 434/236 |
| 2004/0115605 A1 * | 6/2004 | Cooper | | 434/236 |
| 2004/0218732 A1 * | 11/2004 | Menard et al. | | 379/45 |
| 2004/0248070 A1 | 12/2004 | Ancier | | |
| 2005/0244799 A1 * | 11/2005 | Skenandore | | 434/238 |
| 2007/0165649 A1 * | 7/2007 | Moritz | | 370/395.64 |
| 2008/0227065 A1 * | 9/2008 | Hamway et al. | | 434/236 |
| 2009/0251312 A1 * | 10/2009 | Shelton et al. | | 340/539.13 |

* cited by examiner

*Primary Examiner* — Xuan Thai
*Assistant Examiner* — Robert J Utama
(74) *Attorney, Agent, or Firm* — Lawrence R. Oremland, P.C.

(57) ABSTRACT

An apparatus and method are provided, for enabling communication between an administrator and a student regarding behavior activities of the student. The apparatus comprises (a) a transmitter configured to be carried by an administrator, and (b) a receiver configured to be carried by a student. The transmitter and receiver are configured to (i) be selectively placed in circuit communication with each other by an initiation signal originating from the transmitter or receiver, (ii) enable communication from the administrator to the student via the receiver regarding behavioral activities of the student or communication from the student to the administrator if the student feels a need to communicate with the administrator regarding behavioral activities of the student, and (iii) enable the receiver to communicate with the student in a predetermined fashion regarding behavior activities of the student in the absence of communications from the administrator.

12 Claims, 9 Drawing Sheets

BEHAVIORAL MODIFICATION SYSTEM AND METHOD

RELATED APPLICATION/CLAIM OF PRIORITY

This application is related to and claims priority from provisional application Ser. No. 60/878,777, filed Jan. 4, 2007, which provisional application is incorporated by reference herein.

BACKGROUND

The present invention relates to a new and useful behavioral modification system and method for use with students in a multitude of environments, and designed to enable an administrator and student to effectively communicate regarding behavioral activities of the student. The present invention is particularly useful in enabling an administrator to effectively communicate with a student regarding behavioral activities of the student, in a way that is helpful to both the administrator and the student, and minimizes disruptive effect to other students who are not intended to be affected by the communications.

SUMMARY OF THE PRESENT INVENTION

According to the present invention, an apparatus enabling communication between an administrator and a student comprises (a) a transmitter configured to be carried by an administrator, and (b) a receiver configured to be carried by a student. The transmitter and receiver are configured to (i) be selectively placed in circuit communication with each other by an initiation signal originating from the transmitter or receiver, (ii) enable communication from the administrator to the student via the receiver regarding behavioral activities of the student or communication from the student to the administrator if the student feels a need to communicate with the administrator regarding behavioral activities of the student, and (iii) enable the receiver to communicate with the student in a predetermined fashion regarding behavior activities of the student in the absence of communications from the administrator.

In the practice of the method, circuit communication is initiated between the transmitter and the receiver, such that (i) communication from the administrator to the student is enabled via the receiver regarding behavioral activities of the student or (ii) communication is enabled from the student to the administrator if the student feels a need to communicate with the administrator regarding behavioral activities of the student, and (iii) the receiver communicates with the student in a predetermined fashion in the absence of communications from the administrator.

According to the preferred form of the present invention, the receiver communicates with the student in a predetermined fashion to accumulate reward credits for the student in the absence of communications from the administrator. Moreover, the administrator can selectively communicate with the student in one fashion such that the accumulation of reward credits is suspended. In addition, the administrator can selectively communicate with the student in another fashion such that reward credits are deducted from the accumulation, until the administrator signals the receiver to begin accumulating reward credits in the absence of further communications from the administrator. Still further, the administrator can selectively communicate with the student such that additional reward credits are assigned.

Further according to a preferred embodiment, data is accumulated and stored, by either or both of the transmitter and receiver regarding communications between the administrator and student, so that such data can be uploaded into a computer and analyzed. The data that is accumulated and stored can include any or all of the following: (i) the time of each communication between the transmitter and receiver, (ii) the number of communications in either the one or the other fashion from the transmitter to the receiver, (iii) reward credits accumulated, (iv) suspension of reward credits, (v) addition of reward credits, (vi) deduction of reward credits, (vii) resumption of accumulation of reward credits.

Also according to a preferred embodiment, the receiver is configured to communicate with the student via any or all of the following ways: (i) visual, (ii) auditory, (iii) kinesthetic.

The apparatus and method of the present invention can be practiced by interactive electronic devices utilizing wireless, radio-frequency operation to allow administrators (e.g. Instructors, Teachers, Parents) to remotely and discreetly modify the behavior of students (e.g. children), helping them to learn adaptive behaviors via different learning principles and via different sensory pathways. The apparatus and method is designed to track desirable behaviors as the child works toward a reward, and can provide cues to the child regarding frequency of target behaviors or passage of time and can help in avoiding positive reinforcement of negative behaviors. The strength and potency of teaching and parenting efforts can be dramatically enhanced with the use of the behavioral modification system and method of the present invention.

Further features of the present invention will become apparent from the following detailed description and the accompanying drawings.

DETAILED DESCRIPTION

As described above, the present invention is particularly useful in enabling an administrator to effectively communicate with a student regarding behavioral activities of the student, in a way that is helpful to both the administrator and the student, and minimizes disruptive effect to other students who are not intended to be affected by the communications. In the following detailed description, the principles of the present invention are described in connection with a setting in which an administrator might be a teacher or instructor, and a student might be a child who is being instructed. However, from that description, the manner in which the principles of the present invention can be applied to various administrator/student communications will be apparent to those in the art.

Initially, it is believed useful to define some of the terms that are used in this application. In this application, reference to an "administrator" means any or all of the following: Parent, Responsible Adult, Teacher, Caretaker of a child or Cognitively Challenged Adult. Reference to a "student" means any or all of the following: target individual, minor, child, cognitively challenged adult, patient. Reference to a transmitter or a receiver being "associated with" an administrator or student means that the transmitter or receiver is carried by, worn by, connected with, within reach of, or otherwise within (a) range of the administrator or student such that the transmitter or receiver can be accessed and/or viewed by the administrator or student. Reference to "behavioral activities of the student" means (i) "off task" behaviors such as out of seat, talking to a peer, daydreaming, etc (generally, an activity that interferes with a adult directive, assigned task, or goal set for completion), or (ii) an aberrant behavior (e.g. running, yelling, pushing, foul language, open defiance to a request). The notion of "behavioral activities of the student" is also associated with activities that can lead to reward credits being accumulated (e.g. reward credits can be accumulated for e.g. the completion of an activity, absence of an aberrant behavior, or compliance with a directive). Reward credits lead to a predetermined reward which is known as a reinforcer. Finally, "circuit communication" means wired connection, wireless connection (by electromagnetic, satellite, over the internet, infra-red, radio frequency or blue tooth communications etc), or any other form of circuit by which electric, electromagnetic or electronic signals can be communicated from one component to another.

Figure 1:
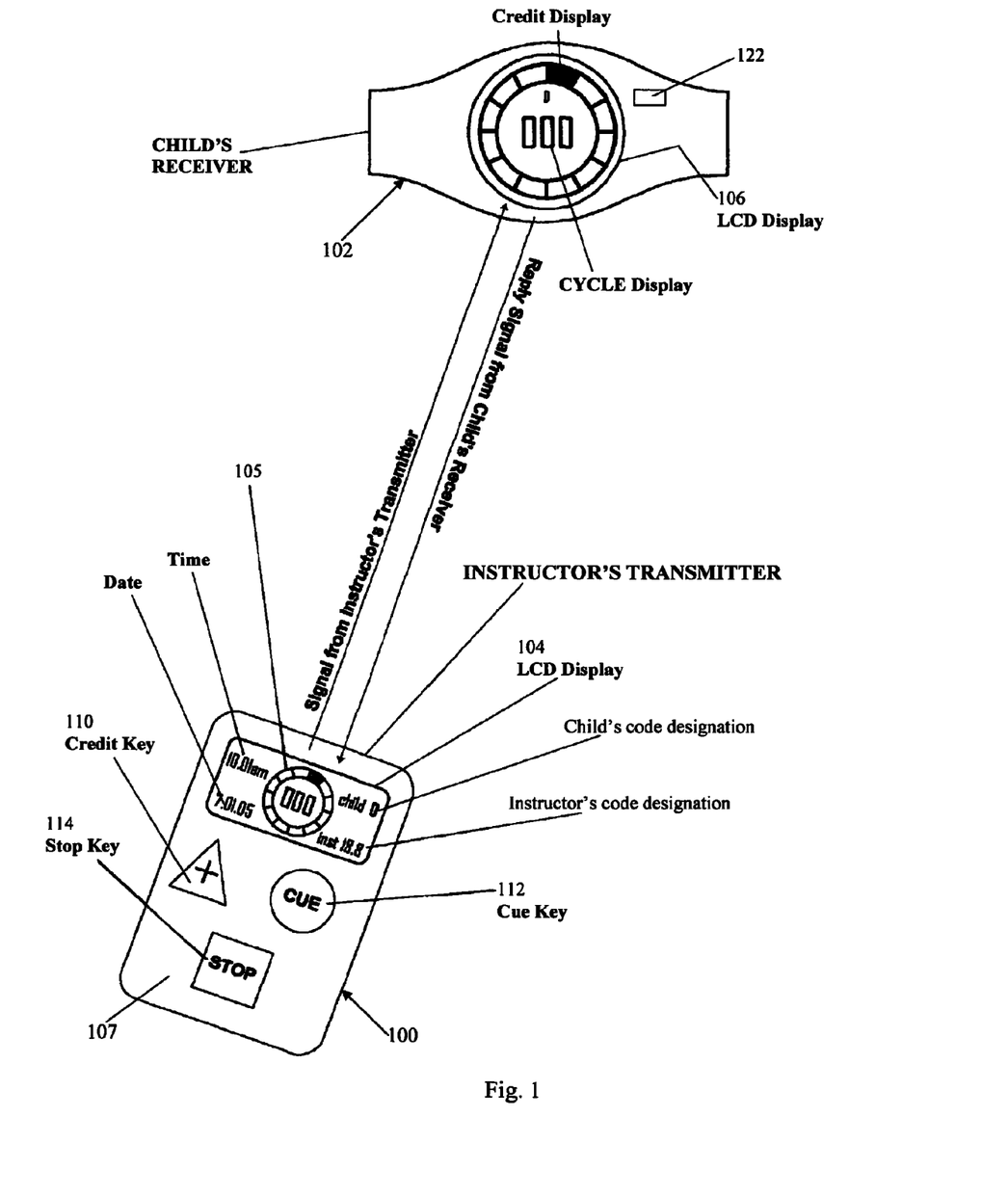
FIG. 1 is a schematic view of the components of a system, and the manner in which they are configured to enable the practice of the method, according to the principles of the present invention.

FIG. 1 schematically shows the components and method for facilitating behavior feedback between an administrator and a student, according to the principles of the present invention. The components comprise (a) a transmitter 100 configured to be associated with an administrator, and a receiver 102 configured to be associated with a student. The transmitter 100 and receiver 102 are configured to be selectively placed in circuit communication with each other by an initiation signal originating from the transmitter or receiver. Moreover, the transmitter 100 and receiver 102 are configured to enable communication from the administrator to the student via the receiver 102 regarding behavioral activities of the student or communication from the student to the administrator if the student feels a need to communicate with the administrator regarding behavioral activities of the student, as described in more detail below. In addition, the transmitter and receiver are configured to enable the receiver 102 to communicate with the student in a predetermined fashion regarding behavior activities of the student in the absence of communications from the administrator, as described in more detail below.

The components shown in FIG. 1 are preferably configured such that once circuit communication has been initiated the receiver 102 communicates with the student in a predetermined fashion to accumulate reward credits for behavioral activities of the student in the absence of communications from the administrator. Those reward credits are shown on a credit display 103, described further below.

Moreover, the transmitter and receiver are configured such that an administrator can selectively, at the administrator's option, communicate with the student in one fashion such that the accumulation of reward credits is suspended. In addition, the transmitter and receiver are configured such that an administrator can selectively communicate with the student in another fashion such that reward credits are deducted from the accumulation, until the administrator signals the receiver to begin accumulating reward credits in the absence of further communications from the administrator. In addition, credits can be added at the administrator's discretion, if appropriate behaviors are observed. This is also known as "catching someone doing good". These features are also described further below.

Also, the transmitter 100 and receiver 102 are each configured to accumulate and store data regarding communications between the administrator and student so that such data can be uploaded into a computer and analyzed. The data that can be accumulated and stored include any or all of the following: (i) the time of each communication between the transmitter and receiver, (ii) the number of communications in either the one or the other fashion from the transmitter to the receiver, (iii) reward credits accumulated, (iv) suspension of reward credits, (v) deduction of reward credits, (vi) resumption of accumulation of reward credits, (vii) additional of reward credits. Additionally, the receiver 102 can be selectively configured to communicate with the student via any or all of the following ways: (i) visual, (ii) auditory, (iii) kinesthetic (e.g. vibratory). These features are also described in more detail below.

An exemplary version of components and method for practicing the principles of the present invention, are described below, in the context of an administrator who is referred to as an "Instructor", and a student who is referred to as a "Child". Still further, in addition to the system components described above, there would be provided (a) Software for Input from Instructor's Transmitter(s), Progress Tracking & Analysis, and (b) a Manual for Use, with Guidelines for best practices designed by Professional Educators and Psychologists Both the Instructor's Transmitter 100 and Child's Receiver 102 are preferably Transceivers [combination of Transmitter and Receiver], which utilize Radio Frequency (RF) wireless transmission. In electronics terminology, the Instructor's device 100 is preferably the "master controller", and the Child's device 102 is preferably the "slave". Therefore, the terms "Transmitter" and "Receiver" are used to indicate the respective devices, and the dominant control is preferably provided by the Instructor's device (although, as described below, there may be some special circumstances in which it may be desirable to have the Child's device 102 initiate the communication between Instructor device 100 and Child device 102 (e.g. in circumstances where the Child senses the likely onset of a behavioral activity that concerns the Child, and wants to signal the Instructor to either closely monitor the Child or even take some action to head off the possible behavioral activity).

In brief, the Instructor—e.g. Teacher or Parent—uses the Instructor's Transmitter 100 to initiate the session, which can include environments such as classrooms, home, hospitals, etc. (However, in environments with controlled time scheduling—such as classrooms—automated session initiation may be pre-programmed into the device's Integrated Circuit (IC), which also signals the Child's Receiver 102 to initiate the session simultaneously.) As shown in FIG. 1, once initiated, the Child's Receiver automatically begins a sequence of accumulating "credits" (also referred to as "reward credits") for good behavior, which continue to accumulate as long as the Instructor observes the child is behaving appropriately in the session environment. Prior to session (or program semester, etc.) start, the Instructor (and/or Institution) predetermines, and then pre-programs, the time increment for each "good behavior credit", such as 5 seconds, 30 seconds, 1 minute, etc. In real time, this automatic credit accumulation is a function of device programming, displayed in real time on both the Instructor's Transmitter and Child's Receiver. It frees the Instructor from having to interface, or even monitor, the process of crediting the child's good behavior.

However, should the child display unacceptable or even questionable behavior in the session environment, the Instructor then utilizes the Instructor's Transmitter 100 to "cue" the Child's Receiver 102 regarding his behavior. Preferably, this function actuates a vibratory mechanism in the Child's Receiver, of sufficient duration to alert the child to their behavior, yet discreet enough that only the Instructor and child know it has been actuated. Once actuated, credit accumulation suspends for a programmed length of time.

Should the Instructor need to "cue" the child again for inappropriate behavior, within the programmed length of time for credit suspension, then a number of credits automatically delete from the child's total credits. Upon the resumption of appropriate behavior, credit accumulation begins again after a predetermined length of time (and/or begins in the absence of a follow-up cue).

The Instructor's Transmitter 100, shown in various views from FIG. 2 through FIG. 6, and Child's Receiver 102, shown in various views from FIG. 7 through FIG. 10, can be preprogrammed as a complete system themselves. In this mode, they would be used day-to-day as simple behavioral modification tools, requiring no further input or analysis by the Instructor and/or Institution. (This mode might also appeal to busy parents.) However, installation of such optional custom software is a desirable format for maximizing the capabilities and results of the System. Such software allows each Instructor or Institution to program its own devices for the "predetermined time periods" previously described. Further, data about each child and their behavior can be downloaded from the Instructor's Transmitter (or the Child's receiver) into a PC or equivalent (e.g. PC 108 in FIG. 14) with the software program loaded in its operating system. This program then provides an analysis tool for professional educators and instructors—and parents too—by tracking the child's progress over time, isolating certain time periods or environments in which inappropriate behavior occurs, etc. The collection, storage, download and display of data for analysis can be as detailed or general as required by the professional; for example, it could show the child's behavior to the second over the course of a semester, year, or several years.

Additional benefits of the behavioral modification system and method of the present invention include its impact on other external measures of the child's educational progress, such as improved grades, homework completion and improved social integration over time.

To further reinforce the child's value of good behavior in terms of credits accumulated, the programming would be configured to tie external rewards to such credits—e.g., allowing the use of credits accumulated to purchase desired items or secure other privileges, etc Each Instructor's Transmitter 100 can be programmed to operate and control multiple Child's Receivers 102, including those controlled by other Instructor's Transmitters 100. The Child's Receiver 102 can also be programmed to be operated and controlled by multiple Instructors' Transmitters 100. This multi-unit operational sequencing with specific time-controlled programming is shown in, but not limited to, the following example:

a) Instructor's Transmitter A controls Child's Receiver A from 9:00 to 10:00 AM.

b) Instructor's Transmitter A controls Child's Receiver B from 10:00:01 to 11:00 AM.

c) Instructor's Transmitter B controls Child's Receiver A from 10:00:01 to 11:00 AM.

In the above sequence, Instructor's Transmitter is preprogrammed to control Child's Receiver A for a pre-determined period (9:00 to 10:00 AM), relinquishing control at 10:00:01 precisely. At the very second it relinquishes control of Child's Receiver A, it begins "searching" for Child's Receiver B, worn by "Child B". Depending on the physical range programmed into the device, Instructor's Transmitter A should "find", and then "take control", of Child's Receiver B at the programmed, optimal range of the wireless device. As wireless transmission is not restricted to line-of-sight (LOS), but capable of travel through walls and most other physical objects, Instructor's Transmitter A should take control of Child's Receiver B prior to Child B entering the classroom, or other session environment. Similarly, Instructor's Transmitter B would take control of Child's Receiver A at nearly the same time, through the same process.

Preferably, credit accumulation may be further customized with pre-programming to begin at whatever specific time the Instructor deems appropriate. The specific time for beginning of credit accumulation might include, but not be limited to: The specific time the Instructor's Transmitter takes control of the Child's Receiver; one minute prior to official classroom time start (assuming the child has entered the classroom, and rules for behavior are already "in force"); or at time of official classroom time start.

Optionally, the Instructor's Transmitter 100 can simultaneously operate and control two Child's Receivers 102, in the event that two children in the classroom are in a program utilizing the behavioral modification system and method. The reader skilled in the art will understand that several methods for achieving this are possible, beginning with the pre-programming of the System devices to recognize more than one other transceiver (i.e., programming of the Integrated Circuit), and respond to it. Certain protocols for such multiple unit interface would be pre-determined in the programming.

For example, if one Child's Receiver 102 is to be controlled simultaneously by two Instructor's Transmitters 100 (such as during a field trip where a large number of students are under the supervision of more than one Instructor), then preferably the pre-programmed format for credit accumulation or credit removal will proceed as if only one Instructor's Transmitter 100 was in control. If the child misbehaves, and "Instructor 1" cues the child to inappropriate behavior, then a second cue within the "credit stop" time period—from either Instructor—will execute the command to delete a pre-determined amount of credits from the child's total. As always, credit accumulation for good behavior proceeds automatically, regardless of how many Instructor's Transmitters 100 are in control and without further interaction on the Instructor's (or Instructors') part(s).

Alternately, if one Instructor's Transmitter 100 is to simultaneously control two Child's Receivers 102 (a potential classroom situation, or "at home" situation of a Parent), then the programming of the Instructor's Transmitter 100 will facilitate the means by which the Instructor cues one child or the other (or both), in the event of misbehavior. One specific example of how this might be accomplished: When the Receivers 102 of two children are under control, the Instructor's Transmitter IC automatically formats the cue for misbehavior of child "A" to be one actuation of the cue key; and two actuations (one rapidly following the other) for child "B". Although it is unlikely that more than two children would be under control of a single Instructor (i.e., by a single Instructor's Transmitter 100), extension of this format to three rapid actuations of the cue key for child "C", and so on in this manner will be understood by the reader skilled in the art.

The display of credit accumulation and total (on the Instructor's Transmitter LCD Display 105) for more than one child might be accomplished with either a split-screen; or, an alternating display of each child's information.

In any of the preceding scenarios regarding multiple Instructor control of a single child, or single Instructor control of multiple children, the optional custom software may be designed to provide specific information regarding the actions taken at any second. This includes but is not limited to: Noting which Instructor cued the child, the correlation of misbehavior with two children present, comparison of behavior in sessions with two children, etc.

At all times, manual override of the preceding sequences is possible.

The behavioral modification system is a system of battery-powered, interdependent electronic devices utilizing Radio Frequency (RF) as their means of communication with each other, shown in FIG. 1. As previously stated, in electronics terminology the Instructor's Transmitter 100 is preferably described as the Master controller, and the Child's Receiver 102 the slave of the two devices. Although the terms "Transmitter" and "Receiver" are used to describe each device, each is a transceiver, which is an RF-operable electronics device capable of sending, and receiving, digitally coded information.

Each RF-operable device includes, but is not limited to, the following components: At least one antenna; a bi-directional coupling method (transmission line) between antenna and transceiver; a receive processor that processes receive signals from the antenna; a transmit processor that processes transmit signals through the antenna; and a media access controller/baseband processor that receives signals from the receive processor and provides output signals for transmission. Additional components include but are not limited to a Liquid Crystal Display (LCD, e.g. Instructor display 104, Child display 106), with or without backlight, and other electronic components comprising the Integrated Circuit (IC).

The Instructor's Transmitter 100, shown in various views in FIG. 2 through FIG. 6, is a small, handheld remote control Radio Frequency transceiver that an Instructor, Teacher or Parent uses to signal and control the child's behavior through the Child's Receiver unit, which is also a transceiver. The exterior housing 107 is fabricated in a polymer such as, but not limited to, Polycarbonate (PC), ABS or other suitable material, and is preferably similar in size and shape to remote control transmitters used to lock/open doors and/or set alarm systems in automobiles. It is battery-powered, preferably by two (2) AAA batteries, but not limited to this specific battery type. A description follows of the preferable format for the unit's components and functional interface on its front side, from top to bottom.

Figure 2:
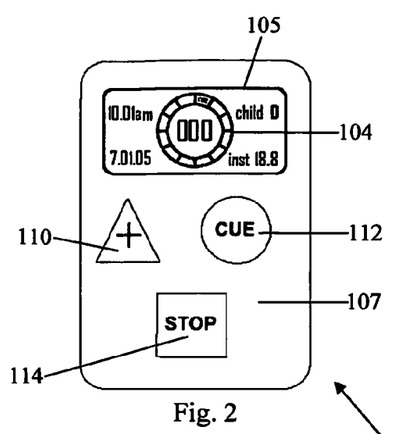
FIG. 2 is a schematic front view of the Administrator's Transmitter for the system and method of FIG. 1.
Figure 3:
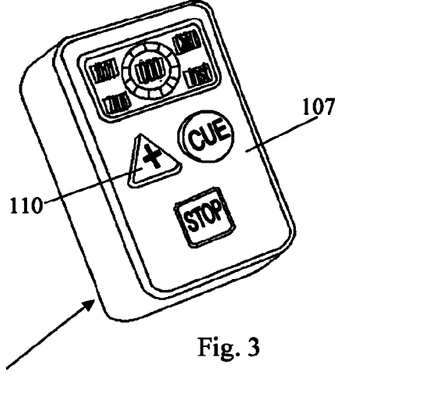
FIG. 3 is a schematic, perspective view of the Administrator's Transmitter for the system and method of FIG. 1.

The LCD Display 104, as seen in FIG. 2, provides the Instructor with a visual duplication of the real-time Credit accumulation information displayed on the Child's Transmitter, in LCD format. Each 30° segment represents a credit accumulation (=to 5 seconds in the image above) in the current cycle, with the number of cycles completed (each cycle=60 seconds, per above) represented in the inset center numeral (in this example, "002"). Additionally (and appearing only on Instructor's Transmitter display), it shows:

a) Time
b) Confirmation of signal lock and reciprocal transmission between the devices (when the IT is searching for the CR, or if the signal was lost or terminated accidentally, this process would preferably be represented by a flashing question mark ["?"]; and confirmation of the specific child/Child's Receiver 102 the Instructor's Transmitter 100 is controlling (preferably represented with some type of alphanumeric designation for reasons of privacy, such as "child D" shown in FIG. 1).
c) Date
d) Instructor's initials (suggested here as "18" for letter "R" and "8" for letter "H"=Instructor "RH")

The reader skilled in the art will understand that the preceding description of the information to be displayed on the Instructor's Transmitter 100 is only one possible embodiment; and that other possible embodiments include a more simplified information display; a more detailed information display; or no information display at all, depending on the environment in which the behavioral modification system is to be used. The skilled reader will further understand that other embodiments do not in any way alter the basic function of the instant invention.

The Credit Key 110 is a triangular shaped function key with + symbol, or preferably, an alternate key shape utilizing a graphic image of the triangular shape to designate it as the Credit Key. When actuated, this signals the Child's Receiver 102 unit to start an automatic "count-up sequence" of credits for positive behavior ("session initiation"), displayed visually on both the Child's Receiver 102, and on the small LCD Display of the Instructor's Transmitter. The Credit Key 110 can also be used to initiate accumulation of additional credits to reward unexpected "good" behavior. As previously noted, automatic session initiation can be pre-programmed into the Instructor's Transmitter, for environments in which session start and end times are fixed (e.g., classrooms, etc.).

The Cue Key 112 is circular shaped function key, or preferably, an alternate key shape utilizing a graphic image of the circular symbol of a specific type to designate it as the Cue Key. This graphic image may include but not be limited to: Abstract representations of a human face, in part or full; abstract representation to suggest "frowning", or "misbehavior" or similar; vibratory ripples; etc. This key is used to signal activation of a vibratory, auditory (beep), or visual (flashing light) mechanism in the Child's Receiver 102, alerting the Child to unacceptable behavior. Simultaneously, it immediately stops the accumulation of credits for a pre-programmed length of time, such as 30 seconds, 1 minute, etc. If the child then reverts to positive behavior, and the Cue Key not actuated again within a comparable (or other pre-programmed) time period following initial actuation, then the automatic sequence of credit accumulation for positive behavior by the child resumes.

The Stop Key 114 is a square shaped function key, or preferably, an alternate key shape utilizing a graphic image of the square symbol to designate it as the Stop Key, which is used to terminate the session. It also allows the Instructor to terminate the session prior to the end of its specified length; for example, if the child's behavior requires physical removal from the room; or, an event unrelated to the child's behavior requires that the Instructor must leave the room/facility, or otherwise terminate the instruction (such as an emergency situation). As with the Credit Key, session termination can be pre-programmed for a pre-set time (such as the end of a class), freeing the Instructor from this task. However, even with this pre-programmed session termination, the Instructor retains the ability to manually terminate the session earlier by actuating the Stop Key at any time.

Additionally, visual means for confirmation of sufficient battery power for signal transmission may be incorporated in the Instructor's Transmitter 100, such as but not limited to: Window with LED indicator at or near the top of the device, as seen in the front view of the design in FIG. 15; information that may be displayed on the LCD Display; etc.

The Instructor may re-start the stopped session any time thereafter, by actuating the Credit Key once again if the device has been pre-programmed, it will revert to its programmed cycle.

The Credit Amount is pre-determined preferably through the custom software when programming the Instructor's Transmitter 100, via the USB cable connection 106 which is described in more detail in the following paragraph. This allows the Instructor to control different amounts of Credit accumulation—selecting from increments of 5 seconds, 15 seconds, 30 seconds, 1 minute, etc. Alternately, it may be manually pre-set by actuating a racetrack-shaped slide switch located either on the front or rear of the unit.

Figure 4:
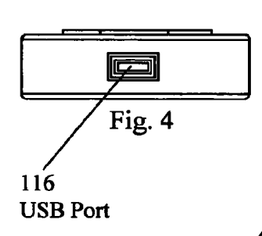
FIG. 4 is a schematic front end view of the Administrator's Transmitter for the system and method of FIG. 1, showing the USB port for data download.
Figure 5:
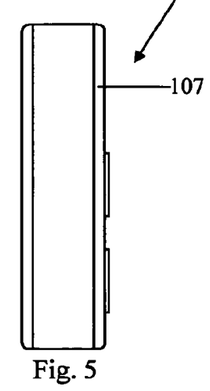
FIG. 5 is a schematic, profile view of the Administrator's Transmitter for the system and method of FIG. 1.
Figure 6:
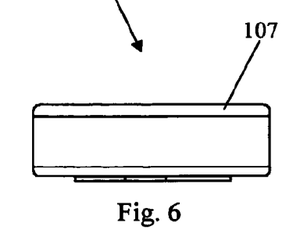
FIG. 6 is a schematic, top view of the Administrator's Transmitter for the system and method of FIG. 1.
Figure 14:
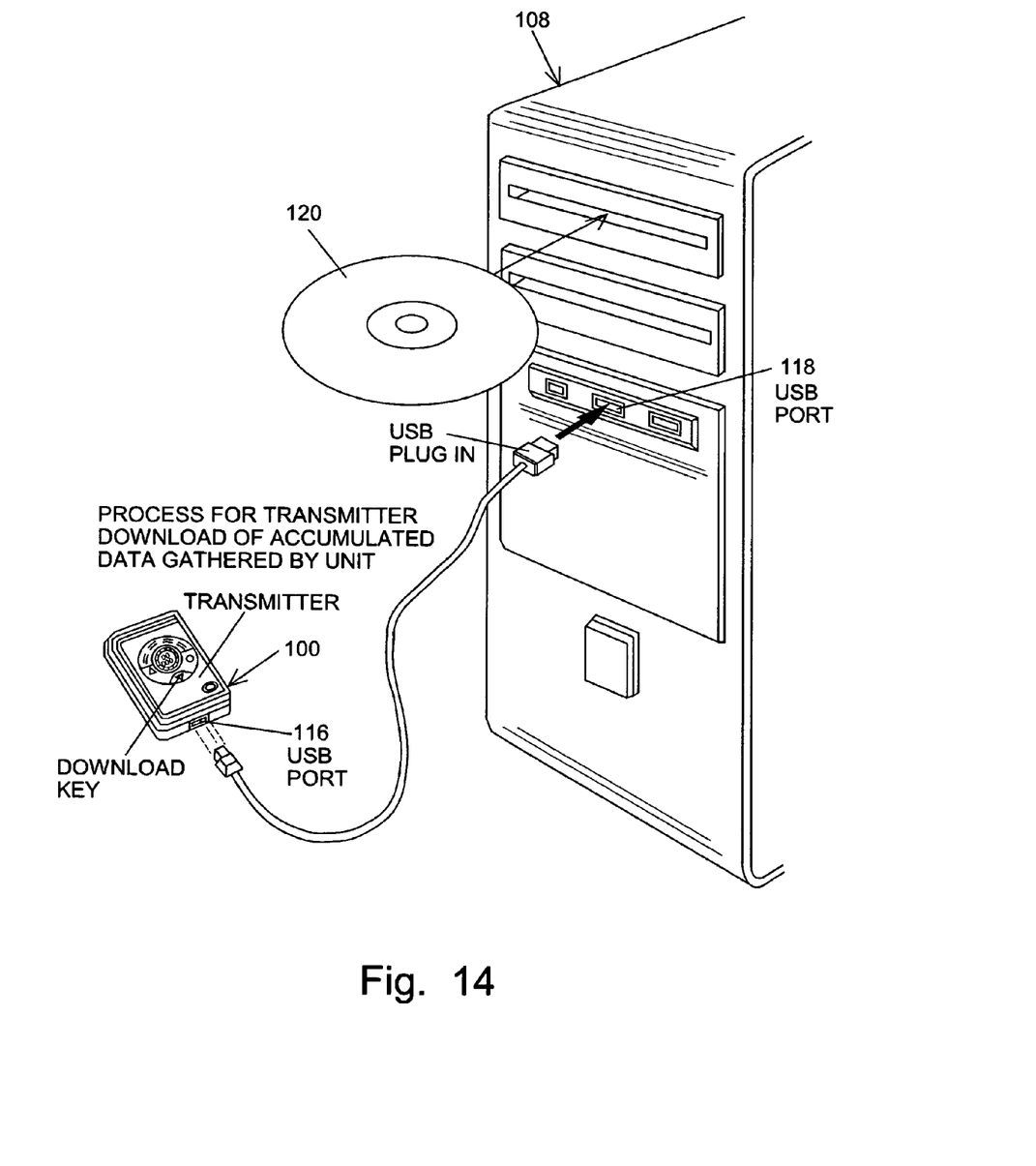
FIG. 14 is a schematic perspective view showing the process of data download from the Administrator's Transmitter to a CPU, according to the principles of the present invention.

To download the data from the Instructor's Transmitter 100 into the computer, assuming the optional custom software has been installed, a port 116 shown in FIGS. 4, 14, for insertion of a USB cable, or other high-speed data transmission connection, is located on the very bottom of the Instructor's Transmitter. Preferably, the other end of the cable has a USB plug, which plugs into the computer 108's USB Port 118; however, this connection may be other format such as "firewire", etc. The device would then automatically download its stored information into the computer, for detailed analysis by Instructors, Parents and other professionals.

Other means for transmitting the data stored in the Instructor's Transmitter includes wireless transmission, for which any number of wireless protocols are available.

The data stored would include a record of each session with the child over the course of a year. This might include the date and precise time of each cue; the amount of any credits deleted during the session; the total amount of credits gained during the session; if a session was terminated before completion, and for what reason (which might require annotation later by the Instructor); etc.

In operation, the Instructor's Transmitter 100 is actually quite simple: The Instructor will use the Credit Key 110 to initiate the session; thereafter, the Cue Key 112 during the session; and finally, the Stop Key 114 once (to terminate the session). Preferably, with the optional custom software installed and the System devices (IT and CR) programmed with the software, session initiation and termination can be further simplified through automation of these tasks, and the Instructor can utilize the Credit Key 110 during the session to add additional reward credits for unexpected "good" behavior. (Again, recommended for those environments with fixed session start and end times, such as classrooms and institutions. At all times, manual override of session initiation, termination, re-start, etc. remains an option to the Instructor.)

In an alternate embodiment, the Instructor's Transmitter may comprise a specially programmed Personal Digital Assistant, commonly known as a PDA, which is a handheld device combining several computing and communication functions into one device. The custom software loaded into a PC, server or other computer network would also program the PDA to replicate the functions, operation and displays of the Instructor's Transmitter previously described, including determination of which keys correlate to the Credit, Cue and Stop Keys of the dedicated Instructor's Transmitter of the Behavioral modification system.

In yet another embodiment, the Instructor's Transmitter may be configured with alternate keypad input format, such as more simplified keypad input with Cue Key only, or Cue Key and one additional key for input; or, keypad input incorporating more than the thee keys shown in FIG. 1. The reader skilled in the art will further understand that other embodiments for keypad input do not in any way alter the basic function of the instant invention.

The Child's Receiver 102, shown in various views in FIG. 7 through FIG. 10, is also a Radio Frequency transceiver, with a watch type format worn on the wrist by the child. The means for holding the Child's Receiver in place around the child's wrist includes, but is not limited to: Velcro closure; integral molded posts and holes, in which the molded posts press-fit through the holes in the molded wristband; or buckle type closure. In place of the standard analog or digital watch movement is a special LCD Display showing Credit accumulation, allowing the child to view this process, reinforcing positive behavior. A mechanism (e.g. kinesthetic/sound/visual), assembled internally into the Child's Receiver and actuated by command of the Instructor's Transmitter, discretely cues the child to inappropriate behavior. This multi-sensory mechanism is similar to that utilized in mobile phones and pagers.

The Child's Receiver is battery powered preferably by two (2) rechargeable Lithium "coin" batteries. This battery type (which may be any number of specific Lithium batteries, such as but not limited to, CR-2016, CR-2032, etc.) is preferred for its relatively small, flat and circular configuration, and its rechargeable feature. As the vibratory, sound, and/or visual mechanism requires a significant amount of power to operate through the course of a day, the ability to recharge the small Lithium batteries at day's end is important.

Figure 7:
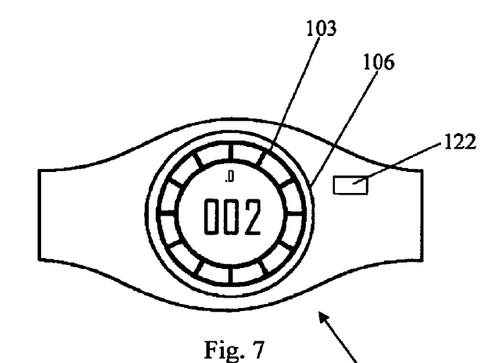
FIG. 7 is a schematic top view of the Student's Receiver for the system and method of FIG. 1.
Figure 8:
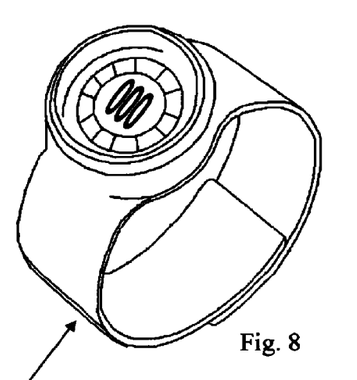
FIG. 8 is a schematic perspective view of the Student's Receiver for the system and method of FIG. 1.
Figure 9:
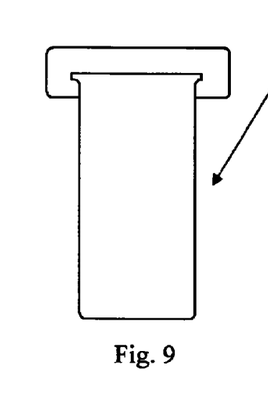
FIG. 9 is a schematic left side view of Student's Receiver of FIG. 8.
Figure 10:
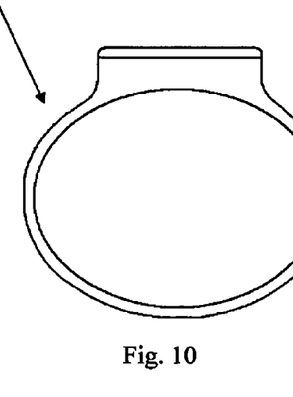
FIG. 10 is a schematic front view of the Student's Receiver of FIG. 8.

Preferably, as shown in FIG. 7, the LCD Display 106 shows credits 103 on the display dial as 30° segments representing a pre-designated time period such as 5 seconds, as shown in FIG. 7. This serves to provide the child with feedback for their good behavior, in a "real time" sense. As shown in FIG. 7, each cycle (one full revolution around the display dial)=one minute, which is shown numerically in the display center (in the image above, it is suggested that 2 cycles, or in this case 2 minutes, have been credited). However, as the Instructor may program a different time period to equal one credit, the character representation on the LCD Display may appear different. In the FIG. 7 drawing, the letter "D" identifies which child is wearing the device. Optionally, credit segments may be displayed with backlit LCD, for a more interesting display that may serve on a subliminal level to "attract the child" to good behavior, and to allow visual monitor of the display in a darkened environment such as "nap time", during a movie, etc. FIG. 7 also shows button 122, which a student can press in order to communicate with the administrator (e.g. if the student feels the onset of a behavioral problem, and wants to signal to administrator to ask the student to step out of the room or take some other action to head off a behavioral problem).

As described in a preceding paragraph, rechargeable Lithium coin batteries would preferably provide the means to power the Child's Receiver; but the reader skilled in the art will understand that the device would also function with non-rechargeable batteries, and possibly batteries of different format than Lithium and/or Lithium coin batteries. In the rechargeable battery format configuration, the Child's Receiver would include a jack for receiving a plug-in AC-DC power adaptor; or, two exposed contacts for interface with two corresponding contacts in a Recharging Base device, which would also be an AC-DC adaptor to recharge the Lithium coin batteries.

The reader skilled in the art will understand that the preceding description of the Child's Receiver is but one possible configuration of the device; and that other possible configurations or embodiments will not in any way alter the function of the instant invention.

As previously described, the custom software program would be an optional, but important, component of the behavioral modification system. Once installed, preferably on a server available to all professionals in each institution, or a computer net available to all professionals in one or more institutional locations, it would provide recommended procedures and best practices for use of the behavioral modification system. However, should a single Instructor install the custom software on an individual Personal Computer or equivalent, the Instructor would also benefit from its analytical tools.

The custom software would allow download and display of the data accumulated by the Instructor's Transmitter(s) (through the USB cable, or other, high-speed data transmission connection previously described in the last point of the Instructor's Transmitter above), facilitating analysis and progress tracking for each child in the program. Finally, the custom software would correlate the individual downloads of separate, individual instructors to create a comprehensive data set for each individual child; alternately, the custom software could also display the comprehensive data set for all children under each individual instructor, for peer, institutional and parental reviews.

The process of loading software, e.g. via a disc 120, and connection of the Instructor's Transmitter for downloading by high-speed data transmission, is shown in FIG. 14.

The software would display several different types of data analysis, which may be graphed in any number of visual or other formats. Data for graphing may include, but not be limited to, changes in the number of cues over time, over settings, over different times of day (AM/PM), by different instructors, etc. The reader skilled in the art will understand that alternate data analysis formats may also be developed, based on the capabilities of the System.

Figure 11:
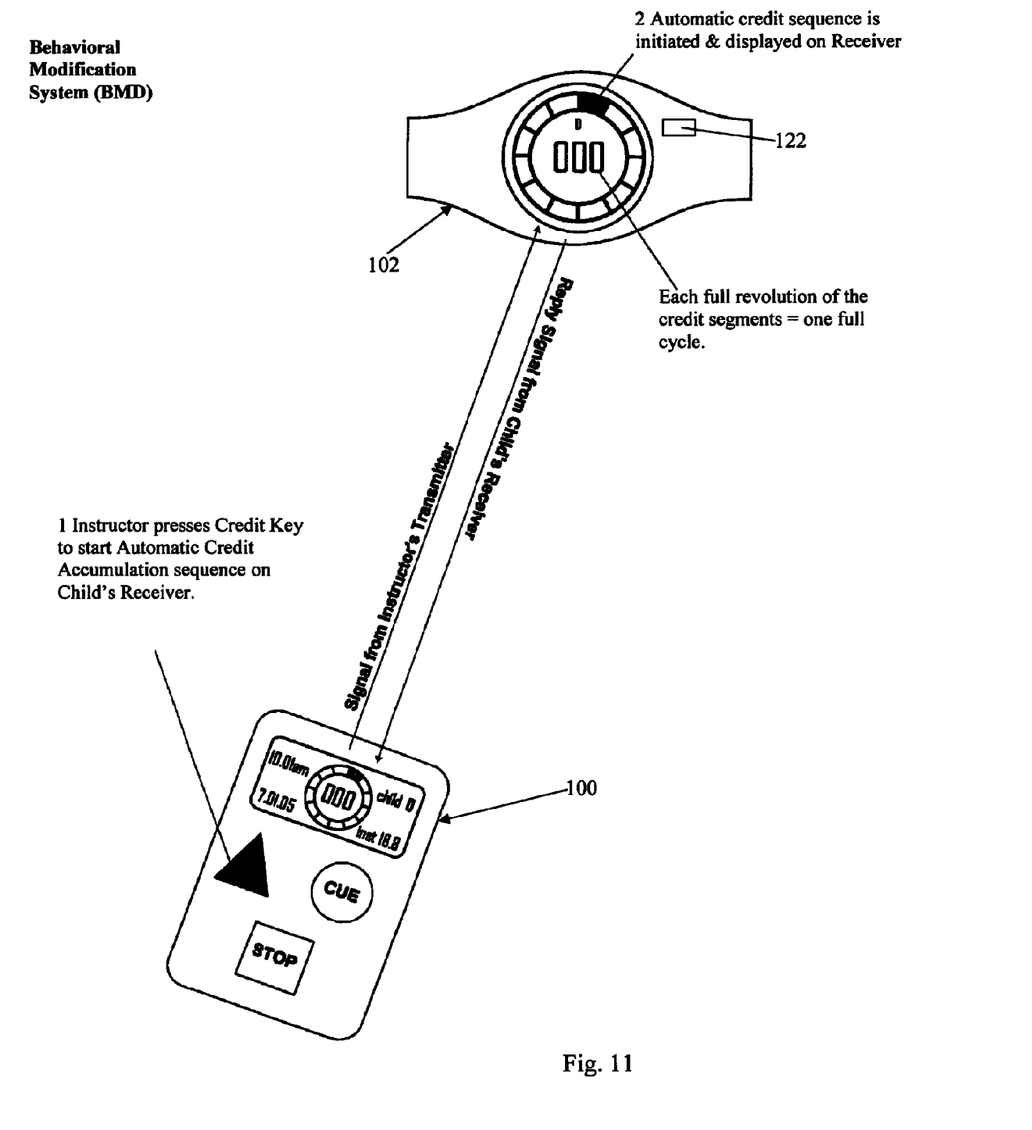
FIG. 11 is a schematic view showing a first operational sequence of the System components, in practicing the method according to the principles of the present invention.
Figure 12:
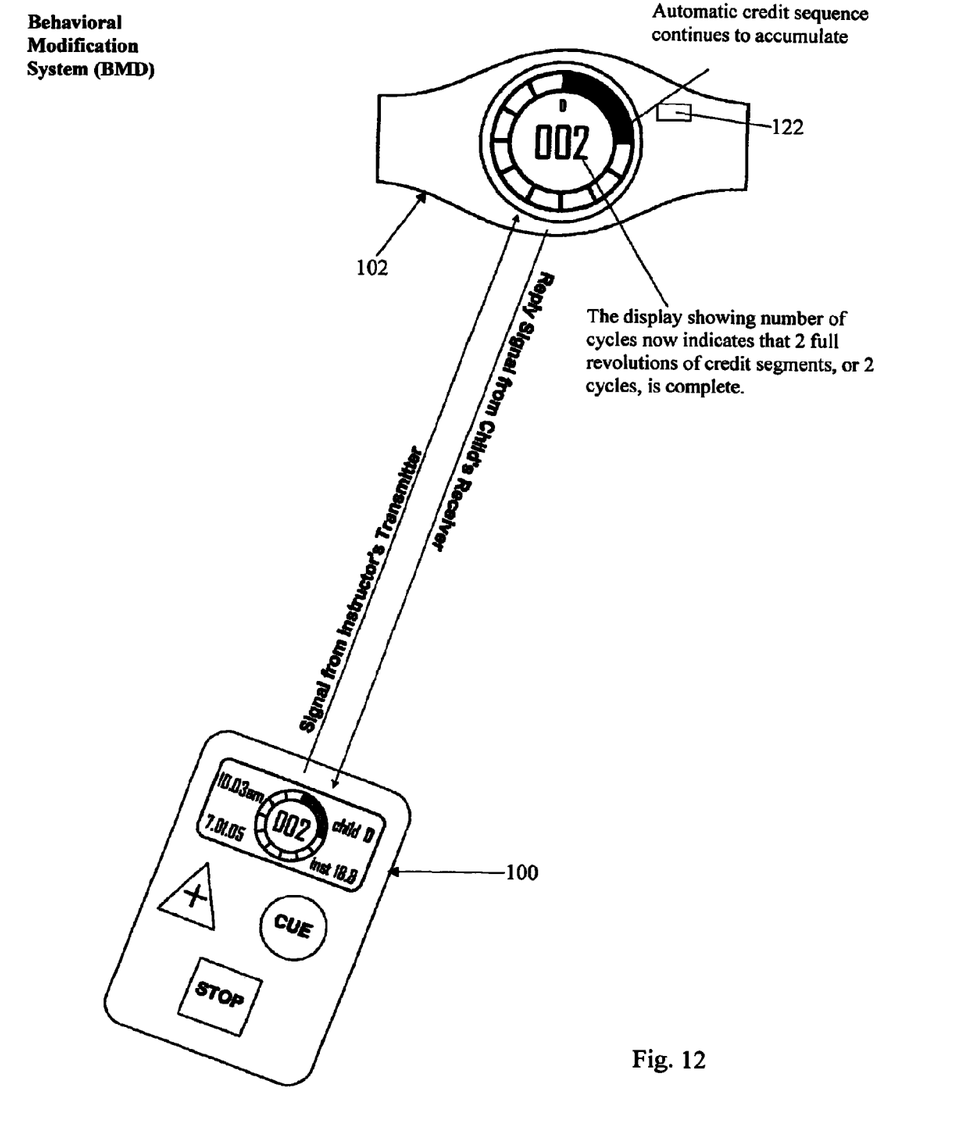
FIG. 12 is a schematic view showing a second operational sequence of the System components, in practicing the method according to the principles of the present invention.
Figure 13:
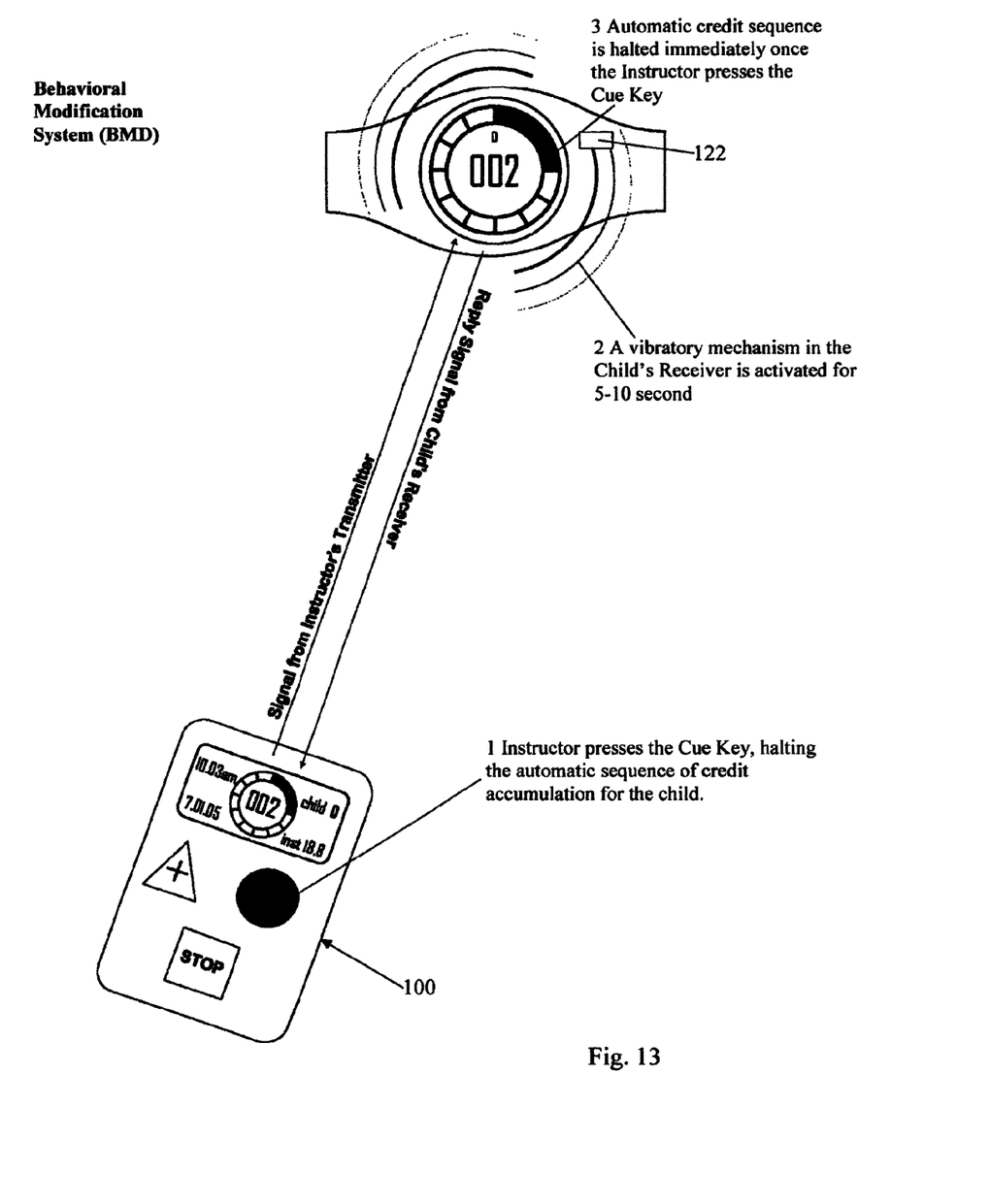
FIG. 13 is a schematic view showing a third operational sequence of the System components, in practicing the method according to the principles of the present invention.

Next, in presentation of one possible Method of using the Apparatus (i.e., interactive devices) of the behavioral modification system, a detailed example of a hypothetical session using the behavioral modification system follows, as shown in FIG. 11 though FIG. 13, including details of the primary functions of the behavioral modification system devices in interaction, and based on one possible set of programming times for the devices:

A) The class begins, with the Instructor pressing the Credit Key on her Transmitter. (Or, pre-programmed automated initiation of the session, as previously described.) The Child's Receiver receives the RF signal, and the automatic credit "count-up sequence" begins, displayed on the Child's Receiver.

B) The child's behavior is positive, and so 12 five-second increments are automatically recorded on his Receiver, and on the Instructor's Transmitter as well. These five-second credit segments appear like a typical minute track on a clock or watch, with which the child will be familiar. At the end of one full revolution, the circular dial segment clears, beginning the count-up sequence again. A "1" appears in the right side column of the three digit panel in the dial center, to display that one full credit cycle has been achieved. (In this case, one cycle=60 seconds, or 12 five-second increments.)

C) The child's behavior continues positive, until 3 cycles/4 five-second increments (i.e., 3 minutes, 20 seconds) into the class, when he begins talking out of turn. The Instructor presses the Cue Key on her Transmitter, activating the vibratory mechanism inside the Child's Receiver, alerting him to unacceptable behavior. For a period of 30 seconds following the actuation of the Cue Key, no credits accumulate—i.e., the credit count-up sequence is automatically on hold.

D) Immediately after being alerted (i.e., cued), the child resumes his positive behavior without further incident. After 30 seconds have elapsed since the Instructor cued the child, the credit count-up sequence automatically resumes, without further interaction required by the Instructor.

E) At 8 cycles/3 five-second increments (8 minutes, 15 seconds) into the class, the child once again misbehaves. The Instructor presses the Cue Key once again; the Child's Receiver vibrates, alerting him to inappropriate behavior, and the credit sequence is automatically suspended from the time the Instructor first pressed the Cue Key.

F) 22 seconds after pressing the Cue Key—within the automatic 30 second hold time programmed into the Behavioral modification system Devices—the child continues his negative behavior. The Instructor presses the Cue Key again, but this time, 6 five-second credits (i.e., 30 seconds) are automatically removed, decreasing the Child's total credits to 7 cycles/9 five-second increments (i.e., 30 seconds deleted from his accumulated time in E, for a new total of 7 minutes, 45 seconds)

G) If the child reverts to positive behavior for 30 seconds following the Cue that deleted his accumulated credits, then the credit count-up sequence begins again automatically, from his new (decreased) total of 7 cycles/9 five-second increments.

H) Should the child misbehave again twice in a following 30 second interval, 6 five-second credits (i.e., 30 seconds)—or more—will again be deleted from his accumulated credit total. (Subsequent deletions will have been pre-programmed into both devices, relieving the Instructor of subtracting additional credits each time, if that is the Instructor's and/or Institution's strategy.)

At all times during the sequence described in A through H above, the Instructor's only interaction with the device was to press the Credit Key once to initiate the session, and then press the Cue Key each time the child misbehaved. All other operations in both the Child's Receiver and Instructor's Transmitter devices performed automatically by the pre-programmed Custom IC (Integrated Circuit) in each device, correlated so that both devices are synchronous in function and real time.

The reader skilled in the art will understand that this is but one method of using the behavioral modification system; and the Method of using the behavioral modification system extends to, and includes, use not only of the basic system devices (Instructor's Transmitter and Child's Receiver) and optional components such as the Custom Software, but may also include the addition and/or integration of other devices and/or components to the System, that expands its possible uses and enhances the potential of its applications, within the scope of the instant invention.

Figure 15:
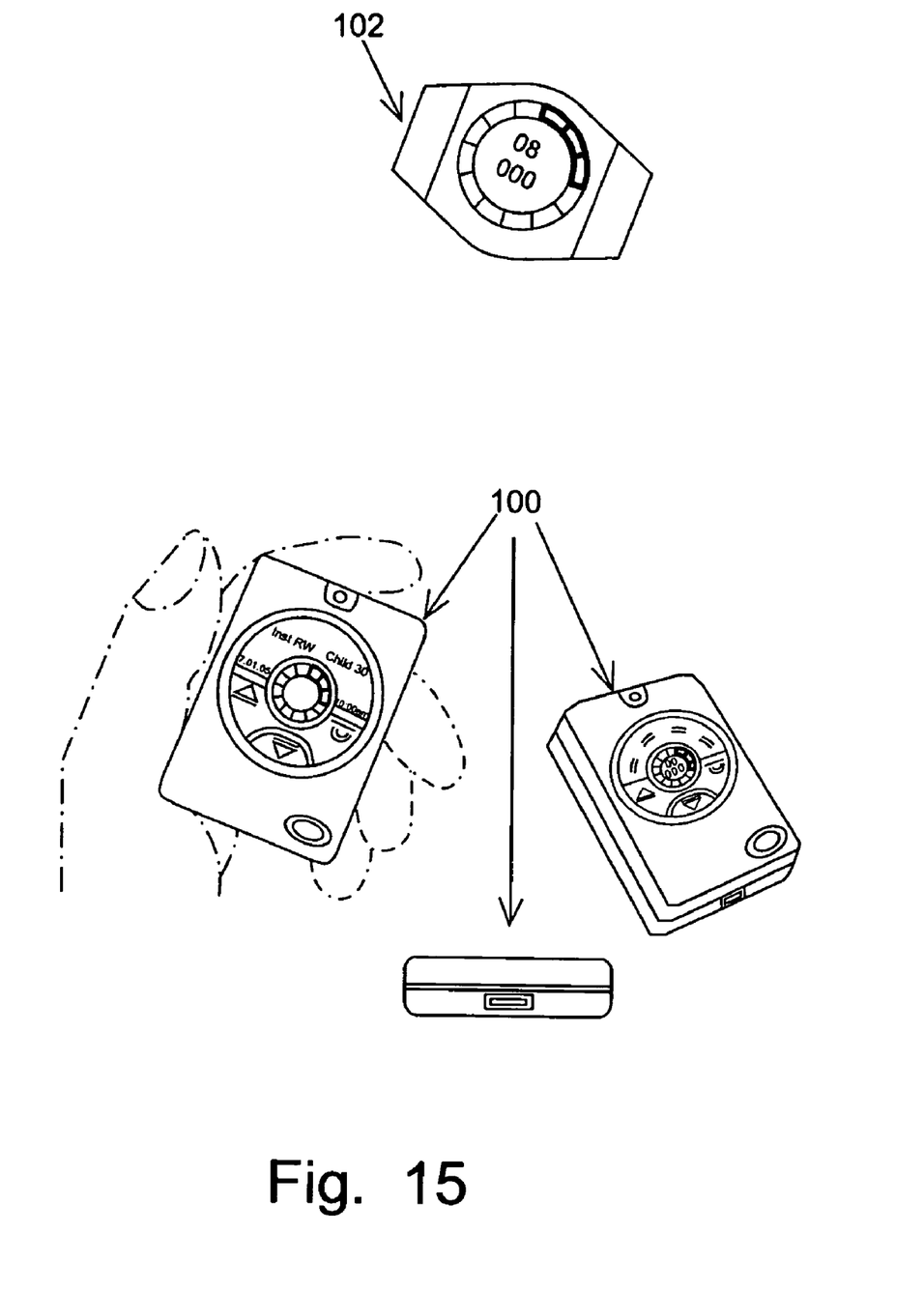
FIG. 15 is a schematic view showing a first aesthetic design for the System components, according to the principles of the present invention.
Figure 16:
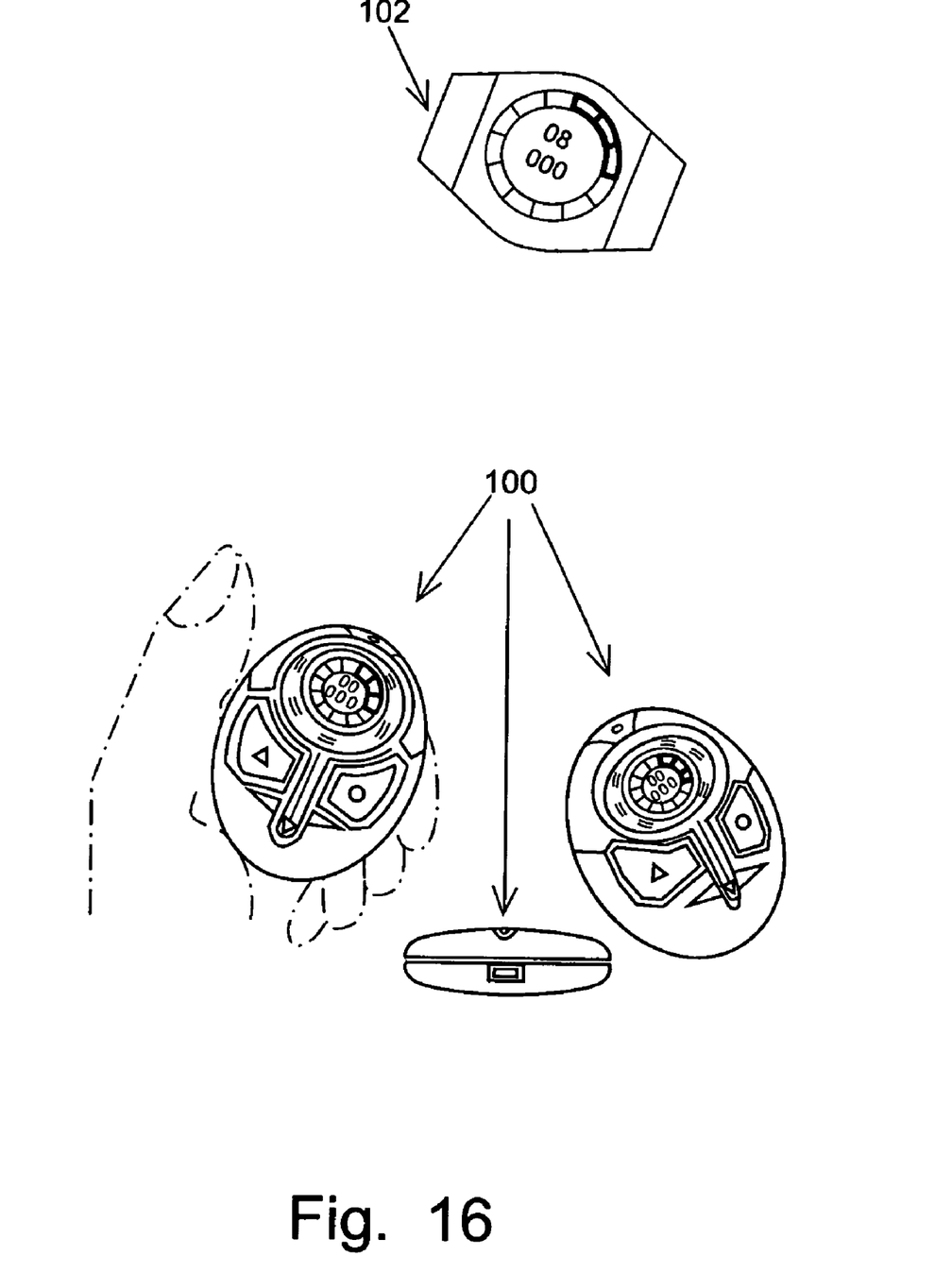
FIG. 16 is a schematic view showing a second aesthetic design for the System components, according to the principles of the present invention.

Aesthetic treatments of the interactive Radio Frequency devices, with emphasis on ergonomics and visual organization of the function controls and real-time information LCD Displays, are shown in FIGS. 15 and 16.

Thus, as seen from the foregoing description, the system and method of the present invention provide behavioral feedback between an administrator and a student. A transmitter is provided that is configured to be carried by an administrator, and a receiver is provided that is configured to be carried by a student. The transmitter and receiver are configured to (i) be selectively placed in circuit communication with each other by an initiation signal originating from the transmitter or receiver, (ii) enable communication from the administrator to the student via the receiver regarding behavioral activities of the student or communication from the student to the administrator if the student feels a need to communicate with the administrator regarding behavioral activities of the student, and (iii) enable the receiver to communicate with the student in a predetermined fashion regarding behavior activities of the student in the absence of communications from the administrator. Communication is initiated between the transmitter and the receiver, and enables circuit communication from the administrator to the student via the receiver regarding behavioral activities of the student or communication from the student to the administrator if the student feels a need to communicate with the administrator regarding behavioral activities of the student, and enabling the receiver to communicate with the student in a predetermined fashion in the absence of communications from the administrator.

The circuit communication initiated between the transmitter and the receiver (i) enables the receiver to communicate with the student in a predetermined fashion to accumulate reward credits for the student in the absence of communications from the administrator, (ii) enables the administrator to selectively communicate with the student in one fashion such that the accumulation of reward credits is suspended, (iii) addition of credits, and (iv) enables the administrator to selectively communicate with the student in another fashion such that reward credits are deducted from the accumulation, until the administrator signals the receiver to begin accumulating reward credits in the absence of further communications from the administrator.

Also, the system and method are preferably designed to enable accumulating and storing data by either or both of the transmitter and receiver regarding communications between the administrator and student so that such data can be uploaded into a computer and analyzed, the data that accumulated and stored including any or all of the following: (i) the time of each communication between the transmitter and receiver, (ii) the number of communications in either the one or the other fashion from the transmitter to the receiver, (iii) reward credits accumulated, (iv) suspension of reward credits, (v) deduction of reward credits, (vi) resumption of accumulation of reward credits. Moreover, the receiver is configured to communicate with the student via any or all of the following ways: (i) visual, (ii) auditory, (iii) kinesthetic.

With the foregoing disclosure in mind, the manner in which various implementations of components and methods for administering behavioral activities of a student, using the principles of the present invention, will be apparent to those in the art.

The invention claimed is:

1. Apparatus for facilitating behavior feedback between an administrator and a student, comprising
  a. a transmitter configured to be associated with an administrator, and a receiver configured to be associated with a student,
  b. the transmitter and receiver configured to
    i. be placed in circuit communication with each other,
    ii. enable communication from the administrator to the student regarding behavioral activities of the student, and
    iii. enable the receiver to communicate with the student in a predetermined fashion regarding behavior activities of the student; and
  c. wherein the transmitter and receiver are further configured such that
    iv. circuit communication can be initially established between the transmitter and receiver to cause reward credits to be accumulated for behavioral activities of the student in the absence of a subsequent cue from the administrator,
    v. the administrator can selectively, at the administrator's option, and via the subsequent cue, cause communication between the transmitter and the receiver that suspends accumulation of reward credits for a predetermined time period, and unless the administrator communicates a further cue to the student via the transmitter and receiver during that predetermined period of time, the accumulation of reward credits will automatically resume.

2. Apparatus as defined in claim 1, wherein the transmitter and receiver are further configured such that when an administrator communicates the further cue with the student during the predetermined time period reward credits are deducted from the accumulation.

3. Apparatus as defined in claim 2, wherein the transmitter and receiver are further configured such that once reward points are deducted from the student, the accumulation of reward points will resume after a subsequent predetermined time period unless during that subsequent predetermined time period the administrator communicates still another cue to the student, via the transmitter and receiver, to cause additional reward points to be deducted from the accumulation.

4. Apparatus as defined in claim 3, wherein the circuit communication that is initially established between the transmitter and receiver to cause reward points to be accumulated is established automatically when circuit communication is initially established between the transmitter and receiver.

5. Apparatus as defined in claim 4, wherein the transmitter and receiver are each configured to accumulate and store data regarding communications between the administrator and student so that such data can be uploaded into a computer and analyzed, the data that can be accumulated and stored including any or all of the following: (i) the time of each communication between the transmitter and receiver, (ii) the number of communications in either the one or the other fashion from the transmitter to the receiver, (iii) reward credits accumulated, (iv) suspension of reward credits, (v) deduction of reward credits, (vi) addition of reward credits, (vii) resumption of accumulation of reward credits.

6. Apparatus as defined in claim 4, wherein the receiver can be selectively configured to communicate with the student via any or all of the following ways: (i) visual, (ii) auditory, (iii) kinesthetic.

7. A method for producing behavior feedback between an administrator and a student, comprising
  a. providing a transmitter configured to be associated with an administrator, and a receiver configured to be associated with a student, where the transmitter and receiver
  b. provide communication from the administrator to the student via the transmitter and receiver regarding behavioral activities of the student, by establishing a circuit communication between the transmitter and receiver that causes reward credits to be accumulated for behavioral activities of the student in the absence of subsequent communications from the administrator, and
  c. suspending the accumulation of reward credits for a predetermined time period if the administrator communicates to the student, via the transmitter and receiver, a cue that initiates the suspension, and
  d. automatically resuming the accumulation of reward credits at the receiver unless the administrator communicates during the predetermined time period a subsequent cue related to the suspension;
  whereby the administrator can selectively, at the administrator's option, communicate with the student via the one cue that the accumulation of reward credits is suspended for the predetermined time period, and
  whereby the accumulation of reward points will automatically resume after the predetermined time period unless the administrator communicates the subsequent cue to the student via the transmitter and receiver during that predetermined period of time.

8. The method of claim 7, further including deducting reward credits from the accumulation when the administrator sends the subsequent cue to the student via the transmitter and receiver during that predetermined subsequent time period.

9. The method of claim 8, further including deducting additional reward points from the accumulation when the administrator communicates the subsequent cue to the student, via the transmitter and receiver, during that subsequent time period.

10. The method of claim 9, wherein the circuit communication that is initially established between the transmitter and receiver to cause reward points to be accumulated is established automatically when circuit communication is initially established between the transmitter and receiver.

11. A method as defined in claim 10, further including accumulating and storing data by either or both of the transmitter and receiver regarding communications between the administrator and student so that such data can be uploaded into a computer and analyzed, the data that accumulated and stored including any or all of the following: (i) the time of each communication between the transmitter and receiver, (ii) the number of communications in either the one or the other fashion from the transmitter to the receiver, (iii) reward credits accumulated, (iv) suspension of reward credits, (v) deduction of reward credits, (vi) resumption of accumulation of reward credits.

12. A method as defined in claim 10, wherein communication between the transmitter and the receiver is established in any or all of the following ways: (i) visual, (ii) auditory, (iii) kinesthetic.

* * * * *